(12) United States Patent
Rao

(10) Patent No.: US 7,647,025 B2
(45) Date of Patent: Jan. 12, 2010

(54) METHOD FOR ADAPTIVELY CONTROLLING AND COORDINATING OTHER CELL INTERFERENCE

(75) Inventor: Anil M Rao, Cedar Knolls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 643 days.

(21) Appl. No.: 11/541,036

(22) Filed: Sep. 29, 2006

(65) Prior Publication Data
US 2008/0081564 A1 Apr. 3, 2008

(51) Int. Cl.
*H04B 1/00* (2006.01)
*H04B 15/00* (2006.01)

(52) U.S. Cl. ......... 455/63.1; 455/453; 455/501

(58) Field of Classification Search ......... 455/405, 455/63.1, 450, 452.1, 501, 503, 522, 447, 455/69, 434, 445, 453, 449, 464; 370/341–343, 370/329, 332–335, 437
See application file for complete search history.

(56) References Cited

U.S. PATENT DOCUMENTS

| 6,522,881 B1 * | 2/2003 | Feder et al. ......... 455/437 |
| 2003/0123425 A1 * | 7/2003 | Walton et al. ......... 370/341 |
| 2006/0094363 A1 * | 5/2006 | Kang et al. ......... 455/63.1 |
| 2009/0179755 A1 * | 7/2009 | Bachl et al. ......... 340/540 |

FOREIGN PATENT DOCUMENTS

WO WO2006007318 * 1/2006

* cited by examiner

*Primary Examiner*—Sujatha Sharma

(57) ABSTRACT

Disclosed is a method, and system thereof, for controlling other-cell interference by adjusting a transmit power parameter for mobile stations in neighboring cells in order to create, within a serving cell, a low interference zone associated with a set of sub-carriers which may be used by edge mobile stations within the serving cell. Rather than restricting the neighboring cells from using the set of sub-carriers associated with the low interference zone, the goal is to reduce the amount of other-cell interference the mobile stations in the neighboring cells can produce with respect to the low interference zone in the serving cell.

19 Claims, 4 Drawing Sheets

METHOD FOR ADAPTIVELY CONTROLLING AND COORDINATING OTHER CELL INTERFERENCE

RELATED APPLICATIONS

Related subject matter is disclosed in the following application filed Aug. 22, 2006, and assigned to the same assignee hereof: U.S. patent application Ser. No. 11/507874 entitled, "A Method For Adaptively Controlling Other Cell Interference," inventor Anil Rao.

FIELD OF THE INVENTION

The present invention relates generally to wireless communication systems and, in particular, to controlling reverse link transmit power in a wireless communication system.

BACKGROUND OF THE RELATED ART

Universal Mobile Telecommunication System (UMTS) is migrating from a Code Division Multiple Access (CDMA) based air interface to an Orthogonal Frequency Division Multiple Access (OFDMA) based air interface in order to increase reverse link capacity. Reverse link capacity can be increased by limiting interference caused by mobile stations within a same cell (also referred to herein as "in-cell interference") or by mobile stations in other cells (also referred to herein as "other-cell interference").

In-cell and outer-cell Interference are caused, in part, when mobile stations transmit over a same carrier or sub-carrier frequency simultaneously. In a CDMA system, i.e., wireless communication system utilizing a CDMA air interface, mobile stations produces both in-cell interference and other-cell interference because mobile stations in the same cell and in different cells are simultaneously transmitting on a same carrier frequency. In-cell interference is the main source of interference in a CDMA system. By contrast, the main source of interference in an OFDMA system, i.e., wireless communication system utilizing an OFDMA air interface, is other-cell interference. In an OFDMA system, mobile stations in the same cell transmit on different sub-carrier frequencies and, thus, the in-cell interference produced by the mobile stations should be insignificant. However, other-cell interference is still produced because mobile stations in different cells may be simultaneously transmitting on the same sub-carrier frequencies. Accordingly, OFDMA systems have higher reverse link capacity than CDMA systems because mobile stations in an OFDMA system produce less in-cell interference than mobile stations in a CDMA system.

In order to increase reverse link capacity in an OFDMA system, other-cell interference needs to be reduced. One way to reduce other-cell interference is to limit mobile stations near the edges of adjacent cells to different sets of sub-carrier frequencies. For example, mobile stations near the edge of a first cell would be restricted to using a first set of sub-carrier frequencies, and mobile stations near the edge of an adjacent second cell would be restricted to using a second set of sub-carrier frequencies, wherein the first set includes different sub-carrier frequencies than those in the second set. Edge mobile stations (i.e., mobile stations near the edge of a cell) in the second cell would not be able to use the first set of sub-carrier frequencies even when there are no edge mobile stations in the first cell using sub-carrier frequencies in the first set, or vice-versa. Such manner of reducing other-cell interference will, however, result in an inefficient use of reverse link resources. Accordingly, there exists a need for a method of managing other-cell interference in a wireless communication system more efficiently.

SUMMARY OF THE INVENTION

An embodiment of the present invention is a method, and system thereof, for controlling other-cell interference by adjusting a transmit power parameter for mobile stations in neighboring cells in order to create, within a serving cell, a low interference zone associated with a set of sub-carriers which may be used by edge mobile stations within the serving cell. Rather than restricting the neighboring cells from using the set of sub-carriers associated with the low interference zone, the present invention reduces the amount of other-cell interference the mobile stations in the neighboring cells can produce with respect to the low interference zone in the serving cell.

In one embodiment, a method of controlling other-cell interference in a wireless system comprises the steps of determining whether a low interference zone of a neighbor cell is interference overloaded, determining whether a high interference zone of the same neighbor cell is interference overloaded, and transmitting zone overload information indicative of whether the low interference zone and/or high interference zone is interference overloaded. The zone overload information is then used to adjust a transmit power constraint of a mobile station in a serving cell.

BRIEF DESCRIPTION OF THE DRAWINGS

The features, aspects, and advantages of the present invention will become better understood with regard to the following description, appended claims, and accompanying drawings where:

DETAILED DESCRIPTION

Figure 1:
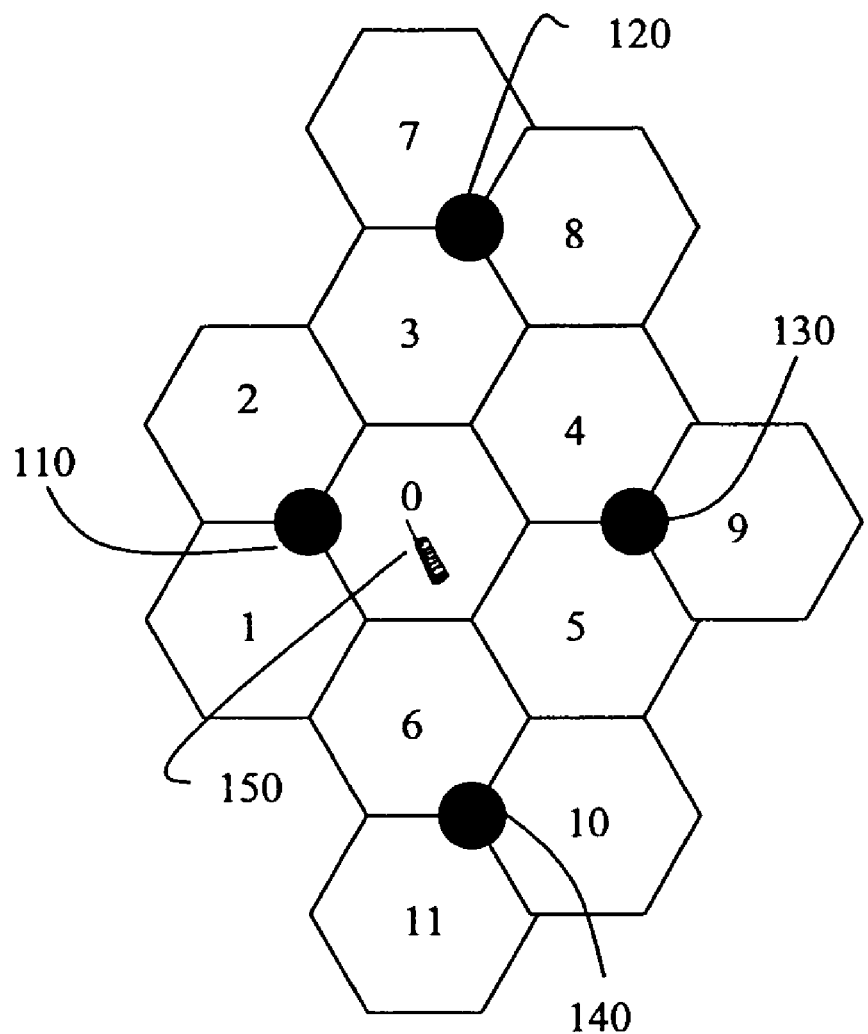
FIG. 1 depicts a wireless communication system used in accordance with the present invention.

For purposes of illustration, the present invention will be described herein with reference to a wireless communication system utilizing an Orthogonal Frequency Division Multiple Access (OFDMA) air interface based on the well-known Universal Mobile Telecommunication System standard. FIG. 1 depicts a wireless communication system 100 comprising base stations 110, 120, 130 and 140 and at least one mobile station 150. Each base station 110, 120, 130 and 140 is associated with a geographical coverage area comprising a plurality of cells or sectors. Specifically, base station 110 is associated with cells 0, 1 and 2; base station 120 is associated with cells 3, 7 and 8; base station 130 is associated with cells 4, 5 and 9; and base station 140 is associated with cells 6, 10 and 11. Mobile station 150 is being served by cell 0.

Each base station serves mobile stations within its respective cells using a same set of orthogonal sub-carrier frequencies. The set of orthogonal sub-carrier frequencies may be partitioned in terms of frequency and/or time for reverse link and forward link usage. For purposes of discussion, a sub-carrier frequency, or time segment thereof, used for a reverse link channel or a forward link channel will be referred to herein as a "reverse link sub-carrier" and a "forward link sub-carrier," respectively, wherein a reverse link channel comprises one or more reverse link sub-carriers and a forward link channel comprises one or more forward link sub-carriers.

Reverse link channels include traffic channels and control channels, and forward link channels include pilot channels, broadcast channels, control channels and traffic channels. Reverse link traffic channels are assigned to mobile stations by a scheduling entity (also referred to herein as a "scheduler") at the base station. A message referred to as a "scheduling grant" indicates to the mobile stations, among other things, the reverse link channel (or associated sub-carriers) being assigned and a maximum transmit power spectral density (Max_TPSD) constraint corresponding to a maximum allowable mobile station transmit power for each of the sub-carriers of the assigned reverse link channel. The scheduling grant is transmitted over a forward link control channel.

Each base station 110, 120, 130 and 140 transmits a known sequence of bits, i.e., pilot signal, over the pilot channel in each of its associated cells. The pilot channel for each cell in a set of adjacent cells is defined using a different set of (one or more) forward link sub-carriers, wherein a set of adjacent cells comprises a serving cell and a plurality of neighbor cells which are adjacent to the serving cell. For example, a set of adjacent neighbor cells may comprise of serving cell 0 and adjacent neighbor cells 1-6. The forward link sub-carriers used to define the pilot channel in cell 0 would be different from the forward link sub-carriers used to define the pilot channels in cells 1-6. Similarly, the forward link sub-carriers used to define the pilot channel in cell 1 would be different from the forward link sub-carriers used to define the pilot channels in cells 0 and 2-6, and so on.

For each cell 01-11, the reverse link sub-carriers are partitioned into two or more sets of reverse link sub-carriers. At least one set would be associated with a "low interference zone." At least another set would be associated with a "high interference zone." Reverse link sub-carriers associated with a low interference zone would typically be assigned to edge mobile stations, i.e., mobile stations near the edge of a cell. Reverse link sub-carriers associated with a high interference zone would typically be assigned to non-edge mobile stations, i.e., mobile stations not near the edge of a cell.

Figure 4:
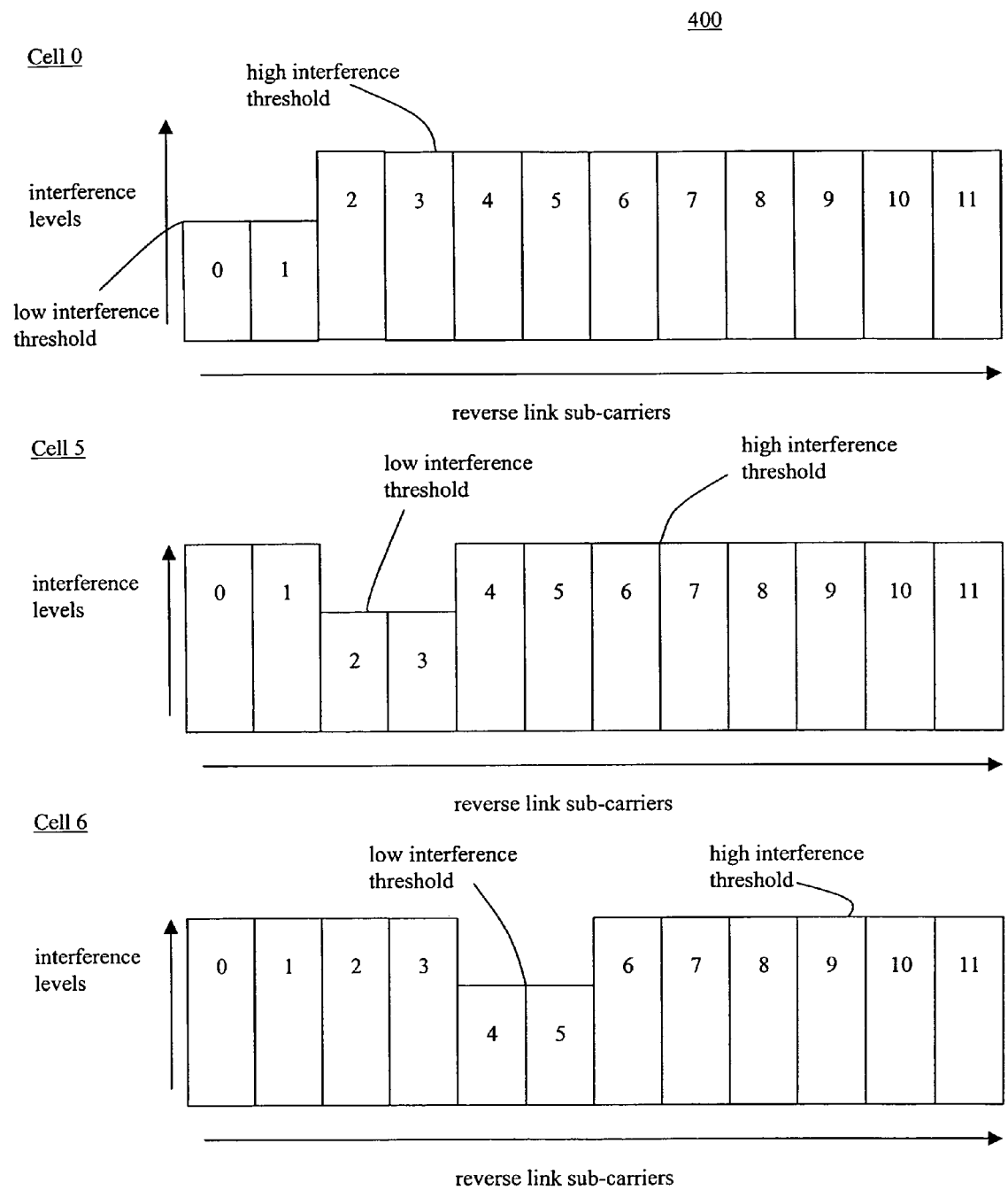
FIG. 4 depicts an illustrative reverse link sub-carrier partition chart for a set of adjacent cells.

For adjacent cells, such as cells 0, 5 and 6, the low interference zone set (i.e., reverse link sub-carrier associated with the low interference zones) would be mutually exclusive with respect to each other. FIG. 4 depicts an illustrative reverse link sub-carrier partition chart 400 for adjacent cells 0, 5 and 6. The low interference zone sets for cells 0, 5 and 6 include reverse link sub-carriers 0 and 1, reverse link sub-carriers 2 and 3, and reverse link sub-carriers 4 and 5, respectively. All other reverse link sub-carriers not in the low interference zone sets may be included in one or more high interference zone sets (i.e., reverse link sub-carrier associated with the high interference zones) for their respective cells. For example, the high interference zone sets for cells 0, 5 and 6 include reverse link sub-carriers 2-11, reverse link sub-carriers 0-1 and 4-11, and reverse link sub-carriers 0-3 and 6-11, respectively. For purposes of illustration, the present invention will be described herein to cells associated with one low interference zone and one high interference zone. This should not be construed to limit the present invention in any manner.

In each cell, other-cell interference is measured for the low and high interference zones. The other cell-interference measurements are then compared to interference thresholds. Specifically, for a low interference zone, the associated other-cell interference measurement (i.e., interference on reverse link sub-carriers associated with the low interference zone) is compared to a low interference threshold. For a high interference zone, the associated other-cell interference measurement (i.e., interference on reverse link sub-carriers associated with the high interference zone) is compared to a high interference threshold, wherein the low interference threshold is a lower threshold relative to the high interference threshold. If the other-cell interference measurement is above the associated interference threshold, the zone associated with that other-cell interference measurement is considered to be interference overloaded.

The low and/or high interference thresholds may be the same or different across all cells, or a subset thereof. If the reverse link sub-carriers are partitioned into two or more low interference zone sets or two or more high interference zone sets, then a different low or high interference threshold may apply to each of the low or high interference zones, respectively. Additionally, the low and/or high interference thresholds may be static (e.g., predetermined) or dynamic (e.g., determined based on how many edge mobile stations are in the cell).

Figure 2:
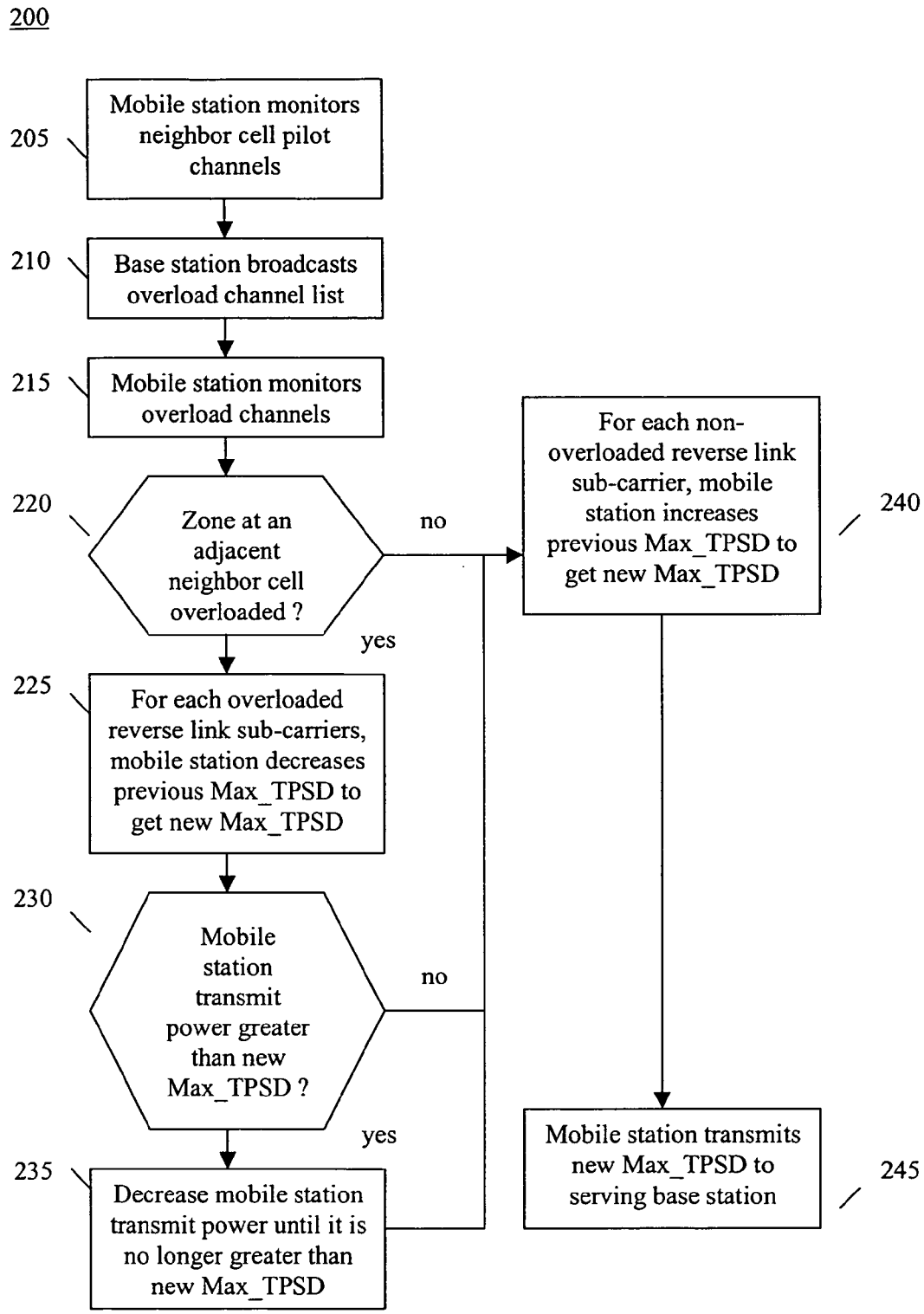
FIG. 2 depicts a flowchart illustrating an adaptive interference control used in accordance with a first embodiment of the present invention.

Information indicating whether a zone is overloaded, hereinafter referred to as "zone overload information," is used to adaptively control other-cell interference. FIG. 2 depicts a flowchart 200 illustrating an adaptive interference control method used in accordance with a first embodiment of the present invention. In this embodiment, zone overload information is communicated to mobile station 150. Such overload information is then used by mobile station 150 to determine whether adjustments should be made to the maximum transmit power spectral density (Max_TPSD) constraints associated with the reverse link sub-carriers assigned to mobile station 150. In another embodiment, the adjustments may be made to some other mobile station transmit power parameter, such as a constraint relating to a total maximum allowable mobile station transmit power, or to actual mobile station transmit power.

In step 205, mobile station 150 is in a call and is monitoring the pilot channels of its neighbor cells, i.e., measuring pilot signal strengths of neighbor cells. While mobile station 150 is in the call, its transmit power is continuously being adjusted in accordance with well-known power control techniques and limited by the Max_TPSD constraints.

In step 210, serving base station 110 transmits, over a broadcast channel (or some other communication channel, such as a control channel) in cell 0, an overload channel list indicating overload channels for at least the adjacent neighbor cells, e.g., cells 1-6. The overload channels can be, for example, a broadcast channel or control channel over which zone overload information is transmitted. Like the pilot channel, the overload channel for each cell in the set of adjacent cells is defined using a different set of (one or more) forward link sub-carriers.

In one embodiment, each base station transmits zone overload information over two overload channels. One overload channel is used to transmit overload information associated with low interference zones, whereas the other overload channel is used to transmit overload information associated with high interference zones. The overload channel list may also indicate which overload channels are associated with low and high interference zones.

The zone overload information may be a flag or other message indicating whether the associated zone in the cell is interference overloaded. The zone overload information may also indicate the reverse link sub-carriers associated with the overloaded zone. Alternately, information indicating the sub-carriers associated with each zone at neighbor cells may be provided by some other method. For example, such information may be provided via a broadcast message or a scheduling grant.

In step 215, mobile station 150 monitors the overload channels indicated by the overload channel list. In step 220, mobile station 150 determines whether a zone at any adjacent neighbor cell is interference overloaded based on the monitored overload channels. In an alternate embodiment, mobile station 150 may only determine whether a zone in the adjacent neighbor cell with the strongest pilot signal strength at mobile station 150 is interference overloaded (instead of any adjacent neighbor cell).

If such a zone is interference overloaded (also referred to herein as an "overloaded zone"), flowchart 200 continues to step 225. Otherwise flowchart 200 continues to step 240.

In step 225, mobile station 150 decreases the maximum transmit power spectral density (Max_TPSD) constraint associated with an overloaded reverse link sub-carrier assigned to mobile station 150. For purposes of this application, the term "overloaded reverse link sub-carrier" should be construed to mean a reverse link sub-carrier that corresponds to an overloaded zone, i.e., reverse link sub-carrier is a sub-carrier in the overloaded zone. For example, suppose mobile station 150 has been assigned reverse link sub-carriers 0, 3, 6, 9 and 11 in cell 0. The low interference zone in cell 5 is interference overloaded. The low interference zone set for cell 5 comprises reverse link sub-carriers 2 and 3. Thus, with respect to cell 5, assigned reverse link sub-carrier 3 corresponds to an overloaded zone, i.e., reverse link sub-carrier 3 is an overloaded reverse link sub-carrier, and assigned reverse link sub-carriers 0, 6, 9 and 11 do not correspond to an overloaded zone, i.e., reverse link sub-carriers 0, 6, 9 and 11 are non-overloaded reverse link sub-carriers.

In one embodiment, the Max_TPSD constraint is decreased based on relative received pilot powers at mobile station 150 of the serving cell and the adjacent neighbor cell with the overloaded zone to which the overloaded reverse link sub-carrier corresponds (also referred to herein as an "overloaded adjacent neighbor cell"). Alternately, the Max_TPSD constraint may be decreased based on relative distances mobile station 150 is from the serving cell and the overloaded adjacent neighbor cell.

Note that this relative received pilot powers (or distances) is indicative of an amount of other-cell interference a mobile station transmission produces in the overloaded adjacent neighbor cell. By using such relative received pilot powers (or distances) as a basis for decreasing the Max_TPSD constraint, the amount of other-cell interference produced by a mobile station in the overloaded adjacent neighbor cell is taken into account. For example, if the relative received pilot powers indicate that a mobile station is producing a high amount of other-cell interference in the overloaded adjacent neighbor cell, the Max_TPSD constraint can be reduced by a large amount, or vice-versa.

In one embodiment, the relative received powers (or distances) is measured using a down pilot power ratio (Down_PPR) corresponding to a ratio between a received pilot power of the overloaded adjacent neighbor cell (P_overloaded_neighbor) at mobile station 150 and a received pilot power of the serving cell (P_serving) at mobile station 150, i.e., Down_PPR=P_overloaded_neighbor/P_serving. Note that if there are more than one overloaded adjacent neighbor cell, then the overloaded adjacent neighbor cell with the strongest received pilot power at mobile station 150 (also referred to herein as "strongest overloaded adjacent neighbor cell") would be used as P_overloaded_neighbor to calculate the Down_PPR. The Down_PPR is used to decrease the maximum mobile station transmit power Max_TPSD constraint associated with the overloaded reverse link sub-carrier in accordance with the following equation:

$$\text{Max\_TPSD\_current} = \text{Max\_TPSD\_previous} - \text{Down\_PPR} \times \text{Step\_Down} \quad (1)$$

where Max_TPSD_current corresponds to a new Max_TPSD constraint, Max_TPSD_previous corresponds to a previous Max_TPSD constraint, and Step_Down corresponds to a reference amount (or down step size) by which the previous Max_TPSD constraint is decreased (i.e., amount Max_TPSD constraint is adjusted down when Down_PPR=1). In an embodiment, the Max_TPSD constraint is not decreased unless the Down_PPR is above a first threshold PPR, e.g., 0.5.

In step 230, mobile station determines whether the mobile station transmit power for the overloaded reverse link sub-carriers is greater than the new Max_TPSD constraint, e.g., Max_TPSD_current. If the mobile station transmit power is greater than the new Max_TPSD constraint, then in step 235 the mobile station transmit power is decreased for that reverse link sub-carrier until it is not greater than the new Max_TPSD constraint. From step 235, or if it is determined in step 230 that the mobile station transmit power is not greater than the new Max_TPSD constraint, or If it is determined in step 220 that no zone at an adjacent neighbor cell is interference overloaded, flowchart 200 continues to step 240.

In step 240, mobile station 150 increases the Max_TPSD constraint for each non-overloaded reverse link sub-carrier assigned to mobile station 150. In one embodiment, the Max_TPSD constraint is increased based on relative received pilot powers of the adjacent neighbor cell with the strongest received pilot signal strength at mobile station 150 (also referred to herein as 'strongest adjacent neighbor cell) and the serving cell. Alternately, the Max_TPSD may be increased based on relative distances mobile station 150 is from the strongest adjacent neighbor cell and the serving cell. From step 240, flowchart 200 continues to step 245, where mobile station 150 transmits a message indicating to base station 110 the new Max_TPSD constraint and associated reverse link sub-carrier, for example, as part of a scheduling request message.

Note that this relative received pilot powers (or distances) is different from the one used to decrease the Max_TPSD constraint. This relative received pilot powers is based on the strongest adjacent neighbor cell. By using such relative received pilot powers (or distances) as a basis for increasing the Max_TPSD constraint, mobile stations farther away from their serving base station may increase its transmit power higher (for the non-overloaded reverse link sub-carriers) and achieve better throughput. Other-cell interference produced by these mobile stations is not a concern since the transmit power which may be increased are associated with reverse link sub-carriers that do not correspond to an overloaded zone at an adjacent neighbor cell.

In one embodiment, the relative received pilot powers (or distances) is measured using an up pilot power ratio (Up_PPR) corresponding to a ratio between a received pilot power of the strongest adjacent neighbor cell (P_strongest_neighbor) at mobile station 150 and a received pilot power of the serving cell (P_serving) at mobile station 150, i.e., P_strongest_neighbor/Up_PPR=P_serving.

The Up_PPR is used to increase the maximum mobile station transmit power (Max_TPSD) constraint in accordance with the following equation:

$$\text{Max\_TSPD\_current} = \text{Max\_TPSD\_previous} + \text{Up\_PPR} \times \text{Step\_Up} \quad (2)$$

where Step_Up corresponds to a reference amount (or up step size) by which the Max_TPSD constraint is increased (i.e., amount Max_TPSD constraint is adjusted up when Up_PPR=1). In one embodiment, the Max_TPSD constraint is not increased unless the Up_PPR is below a second threshold PPR, e.g. 0.7.

In one embodiment, Step_Up and Step_Down are set such that Step_Up<Step_Down. In another embodiment, Step_Up and Step_Down are set such that a desired interference overshoot rate is achieved, wherein the desired interference overshoot corresponds to a desired fraction of time which interference levels in a zone may exceed a particular threshold value. For example, Step_Up and Step_Down are selected in accordance with the following equation:

$$Step\_Up/Step\_Down=Inter\_Overshoot(/1-Inter\_Overshoot) \quad (3)$$

where Inter_Overshoot corresponds to the desired interference overshoot.

Note that, in the embodiment of FIG. 2, the Max_TPSD constraints are calculated at mobile station 150 and transmitted to base station 110. In another embodiment, mobile station 150 transmits the relevant received pilot signal strength (for the strongest overloaded adjacent neighbor cell or strongest adjacent neighbor cell, for example), along with some cell identifier associating the received pilot signal strength with the respective cell, to base station 110 over a control channel, such as a scheduling request channel. Or mobile station 150 transmits the Down_PPR (for the strongest overloaded adjacent neighbor cell) or Up_PPR (for the strongest adjacent neighbor cell), along with some cell identifier associating the Down_PPR or Up_PPR with the respective cell or zone, to base station 110 over a control channel, such as the scheduling request channel. The new Max_TPSD constraints are calculated at base station 110 based on the received information and transmitted to mobile station 150 in a message, such as the scheduling grant.

Figure 3:
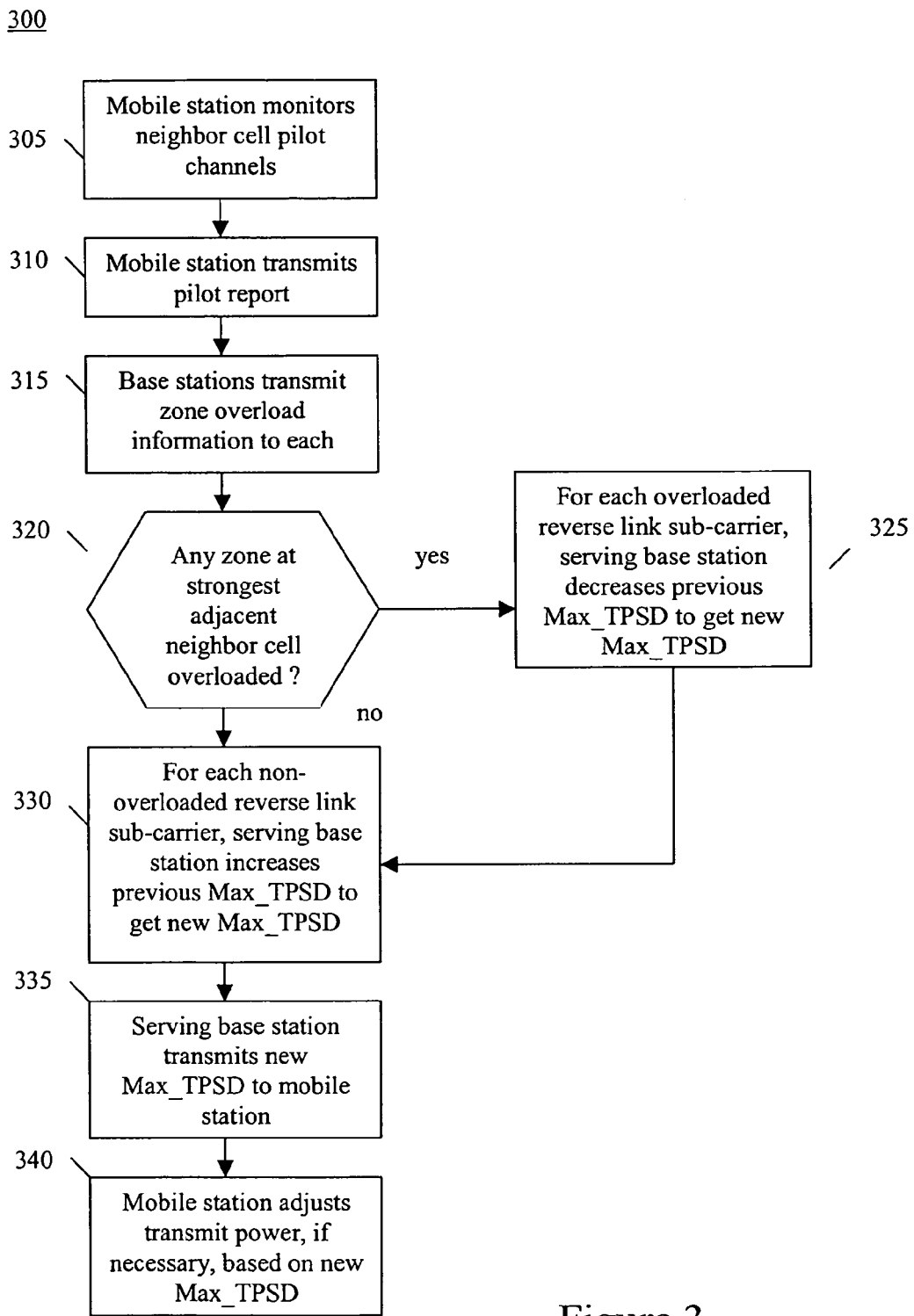
FIG. 3 depicts a flowchart illustrating an adaptive interference control used in accordance with a second embodiment of the present invention.

FIG. 3 depicts a flowchart 300 illustrating an adaptive interference control method used in accordance with a second embodiment of the present invention. In this embodiment, zone overload information is communicated among base stations 110, 120, 130 and 140, and used by the serving base station, i.e., base station of serving cell, to determine whether adjustments should be made to the maximum transmit power spectral density (Max_TPSD) constraints associated with the reverse link sub-carriers assigned to mobile station 150. In another embodiment, the adjustments may be made to some other mobile station transmit power parameter, such as a constraint to a total maximum allowable mobile station transmit power, or to actual mobile station transmit power.

In step 305, mobile station 150 is in a call and is monitoring the pilot channels of its neighbor cells, i.e., measuring pilot signal strengths of neighbor cells. While mobile station 150 is in the call, its transmit power is continuously being adjusted in accordance with well-known power control techniques and limited by the maximum transmit power spectral density (Max_TPSD) constraints.

In step 310, mobile station 150 transmits a pilot report indicating to its serving base station 110 the received pilot signal strengths from both the serving base station and the neighboring base stations. The pilot report may, for example, be the Event 1A, 1B, 1C, and 1D messages used in UMTS for initiating handoffs. In step 315, base stations 110, 120, 130 and 140 transmits zone overload information to each other indicating whether zones in their associated cells are interference overloaded. The zone overload information may be transmitted periodically, transmitted only when interference overload is present, or transmitted when the current overload status of a zone in a cell has changed, e.g., overloaded zone is no longer interference overloaded or vice-versa.

In step 320, serving base station 110 determines whether a zone at the strongest adjacent neighbor cell (i.e., adjacent neighbor cell with strongest pilot signal strength at mobile station 150) is interference overloaded based on the zone overload information. Alternately, serving base station 110 may determine whether a zone at any adjacent neighbor cell is interference overloaded.

If a zone at the strongest adjacent neighbor cell is interference overloaded, serving base station 110 decreases in step 325 the Max_TPSD constraints for each overloaded reverse link sub-carriers assigned to mobile station 150. In one embodiment, the Max_TPSD constraint is decreased based on relative received pilot powers of the strongest adjacent neighbor cell and the serving cell (or based on relative distances mobile station 150 is from the strongest adjacent neighbor cell and the serving cell). For example, the Max_TPSD constraint may be decreased in accordance with the following equation:

$$Max\_TPSD\_current=Max\_TPSD\_previous-PPR2xStep\_Down \quad (4)$$

where PPR2 corresponds to a ratio between a received pilot power of the strongest adjacent neighbor cell (P_strongest_neighbor) at mobile station 150 and a received pilot power of the serving cell (P_serving) at mobile station 150, i.e., PPR2=P_strongest_neighbor/P_serving. In one embodiment, the Max_TPSD constraint is not adjusted unless the PPR2 is above a third threshold PPR, e.g., 0.6.

From step 325, or if it is determined in step 320 that no zone at the strongest adjacent neighbor cell is interference overloaded, flowchart 300 continues to step 330 where serving base station 110 increases the Max_TPSD constraints for each non-overloaded reverse link sub-carriers assigned to mobile station 150. In one embodiment, the Max_TPSD constraints are increased based on relative received pilot powers of the strongest adjacent neighbor cell and the serving cell (or based on relative distances mobile station 150 is from the strongest adjacent neighbor cell and the serving cell). For example, the Max_TPSD constraint may be increased in accordance with the following equation:

$$Max\_TSPD\_current=Max\_TPSD\_previous+PPR2xStep\_Up \quad (5)$$

In one embodiment, the Max_TPSD constraint is not increased unless the PPR2 is below a fourth threshold PPR, e.g., 0.5.

In step 335, serving base station 110 transmits a scheduling grant or other message to mobile station 150 over a forward link control channel, wherein the scheduling grant or other message indicates the new Max_TPSD constraints, i.e., Max_TPSD_current. In step 340, mobile station 150 adjusts its transmit power using well-known power control techniques under the limits of the new Max_TPSD constraints.

Note that, in the embodiment of FIG. 3, the new Max_TPSD constraints are calculated by serving base station 150 and then transmitted to mobile station 150. In an alternate embodiment, serving base station 110 transmits a message to mobile station 150 indicating which zones at adjacent neighbor cells are overloaded. Mobile station 150 can subsequently determine the new Max_TPSD constraints based on this message.

The present invention have been described herein with reference to certain embodiments. This should not be construed to limit the present invention to these embodiments. Other embodiments and combinations of embodiments are possible. For example, instead of adjusting the Max_TPSD constraints, the actual mobile station transmit power may be adjusted using the PPR. Therefore, the spirit and scope of the present invention should not be limited to the description of the embodiments contained herein.

The invention claimed is:

1. A method of controlling other-cell interference in a wireless communication system comprising the steps of:
    receiving zone overload information for a neighbor cell associated with a low interference zone and a high interference zone; and
    adjusting a transmit power parameter of a mobile station in a serving cell based on the received zone overload information.

2. The method of claim 1, wherein the zone overload information indicates the low interference zone is interference overloaded if interference measurements corresponding to the low interference zone is above a low interference threshold.

3. The method of claim 1, wherein the zone overload information indicates the high interference zone is interference overloaded if interference measurements corresponding to the high interference zone is above a high interference threshold, and the low interference threshold being a lower threshold than the high interference threshold.

4. The method of claim 1, wherein the zone overload information indicates the low interference zone is interference overloaded if interference measurements corresponding to the low interference zone is above a low interference threshold, the zone overload information indicates the high interference zone is interference overloaded if interference measurements corresponding to the high interference zone is above a high interference threshold, and the low interference threshold being a lower threshold than the high interference threshold.

5. The method of claim 1, wherein the zone overload information is received by a base station associated with the serving cell.

6. The method of claim 1 comprising the additional steps of:
    prior to receiving the zone overload information, receiving an overload channel list indicating overload channels for one or more neighbor cells; and
    monitoring one or more overload channels indicated in the overload channel list.

7. The method of claim 1, wherein the step of adjusting the transmit power parameter comprises the step of:
    decreasing a transmit power parameter associated with a sub-carrier assigned to the mobile telephone if the received zone overload information indicates that the assigned sub-carrier corresponds to an overloaded zone.

8. The method of claim 1, wherein the step of adjusting the transmit power parameter comprises the step of:
    increasing a transmit power parameter associated with a sub-carrier assigned to the mobile telephone if the received zone overload information indicates that the assigned sub-carrier corresponds to a non-overloaded zone.

9. The method of claim 1, wherein the transmit power parameter is a constraint associated with a maximum allowable transmit power.

10. The method of claim 1, wherein the transmit power parameter is adjusted based on relative received pilot powers of the serving cell and the neighbor cell.

11. A method of controlling transmit power in a wireless communication system comprising the steps of:
    determining whether a first low interference zone of a first cell is interference overloaded;
    determining whether a first high interference zone of the first cell is interference overloaded; and
    transmitting a first zone overload information indicating whether the first low interference zone or first high interference zone is interference overloaded.

12. The method of claim 11, wherein the first low interference zone is determined to be interference overloaded if interference measurements associated with the first low interference zone is above a first low interference threshold, the first high interference zone is determined to be interference overloaded if interference measurements associated with the first high interference zone is above a first high interference threshold, the first low interference threshold be lower relative to the first high interference threshold.

13. The method of claim 11 comprising the additional steps of:
    determining whether a second low interference zone of a second cell is interference overloaded, wherein second cell is adjacent to the first cell, the second low interference zone is associated with a different set of sub-carriers relative to the first low interference zone; and
    determining whether a second high interference zone of the second cell is interference overloaded; and
    transmitting a second zone overload information indicating whether the second low interference zone or second high interference zone is interference overloaded.

14. The method of claim 12 comprising the additional step receiving the first and second zone overload information; and
    adjusting a transmit power parameter of a mobile station in a third cell based on at least one of the received first and second zone overload information.

15. A wireless communication system comprising:
    a first base station operable to determine whether an associated first low interference zone is interference overloaded and whether an associated first high interference zone is interference overloaded and to transmit first zone overload information indicating whether the first low interference zone or first high interference zone is interference overloaded.

16. The wireless communication system of claim 15 further comprising:
    a second base station operable to receive the first zone overload information and to adjust a transmit parameter of a mobile station based on the received first zone overload information.

17. The wireless communication system of claim 15 further comprising:
    a mobile station operable to receive the first zone overload information and to adjust a transmit parameter of the mobile station based on the received first zone overload information.

18. The wireless communication system of claim 17, wherein the mobile station decreases a transmit power parameter associated with a sub-carrier assigned to the mobile telephone if the received first zone overload information indicates that the assigned sub-carrier corresponds to an overloaded zone.

19. The wireless communication system of claim 17, wherein the mobile station increases a transmit power parameter associated with a sub-carrier assigned to the mobile telephone if the received first zone overload information indicates that the assigned sub-carrier corresponds to a non-overloaded zone.

* * * * *

UNITED STATES PATENT AND TRADEMARK OFFICE
CERTIFICATE OF CORRECTION

PATENT NO. : 7,647,025 B2
APPLICATION NO. : 11/541036
DATED : January 12, 2010
INVENTOR(S) : Anil M Rao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Twenty-eighth Day of December, 2010

David J. Kappos
*Director of the United States Patent and Trademark Office*